(12) United States Patent
Ruskin

(10) Patent No.: US 6,334,958 B1
(45) Date of Patent: Jan. 1, 2002

(54) PROCESS FOR MINUTE DOSING OF GRAVITY MEDIA FILTERS

(76) Inventor: Rodney Ruskin, 50 Pemberton Pl., San Francisco, CA (US) 94127

( * ) Notice: Subject to any disclaimer, the term of this patent is extended or adjusted under 35 U.S.C. 154(b) by 0 days.

(21) Appl. No.: 09/565,932

(22) Filed: May 5, 2000

Related U.S. Application Data

(60) Provisional application No. 60/132,676, filed on May 5, 1999.

(51) Int. Cl.$^7$ .................................................. C02F 9/00
(52) U.S. Cl. ..................... 210/739; 210/138; 210/258; 210/456; 210/616; 210/669; 210/806
(58) Field of Search ............................ 210/86, 90, 97, 210/138, 143, 257.1, 258, 259, 266, 456, 532.1, 532.2, 739, 741, 744, 800, 804, 806, 767, 808, 620, 616, 617, 631, 669, 150; 405/36, 37, 39

(56) References Cited

U.S. PATENT DOCUMENTS

| | | | | |
|---|---|---|---|---|
| 4,439,323 A | * | 3/1984 | Ball | 210/744 |
| 5,200,065 A | * | 4/1993 | Sinclair et al. | 210/85 |
| 5,360,556 A | * | 11/1994 | Ball et al. | 210/90 |
| 5,667,670 A | * | 9/1997 | Drewery | 210/86 |
| 5,720,875 A | * | 2/1998 | Stegall et al. | 210/258 |
| 5,989,416 A | * | 11/1999 | Gorton | 210/170 |

* cited by examiner

Primary Examiner—Joseph W. Drodge
(74) Attorney, Agent, or Firm—Christie, Parker & Hale, LLP

(57) ABSTRACT

A process for minute dosing of effluent in a gravity media filter includes filtering incoming sewage in a pre-filter to produce a liquid effluent filtered to less than 100 microns, and pumping the effluent from the pre-filter to a pulse-feeding device preferably comprising a pressure vessel having a controlled pulsing unit. Effluent in the vessel is intermittently discharged in short pressure pulses volume controlled at preselected time intervals. The effluent from the pulse feeding device is forward pulse-fed to an array of drip irrigation emitters spread out over a surface area of a gravity filter containing a filter media such as a sand and gravel filter. Small doses of effluent are fed to the surface area of the gravity media filter by the emitters at a rate substantially less than a standard drip irrigation rate, owing to the intermittent pressure pulses. One preferred drip rate is greatly less than 2 liters per hour. The pre-filtering combined with the slow drip rate enhances continuous treatment of pathogens by available oxygen which avoids biological matter forming in the filter media while also maintaining a reasonable load rate.

30 Claims, 3 Drawing Sheets

PROCESS FOR MINUTE DOSING OF GRAVITY MEDIA FILTERS

CROSS-REFERENCE

This application claims the priority of provisional application No. 60/132,676, filed May 5, 1999.

FIELD OF THE INVENTION

This invention relates to sewage treatment using gravity media filters, and more particularly, to a process for minute dosing of such gravity media filters.

BACKGROUND OF THE INVENTION

Sewage effluent can be treated by gravity media filters. Oxygen deprivation in the filter media is a common problem when treating waste water by gravity media filtration. Continuous availability of oxygen is necessary to remove pathogens, including viruses contained in the liquid effluent subjected to such filtration.

Clogging of the filter media by biological material can produce undesired oxygen deprivation. If the flow rate of effluent to the input side of the filter media is too high, the excess water produces saturated flow which can lead to oxygen deprivation.

Load rate is an important factor in the operation of gravity media filters. It is important to produce a reasonably practical load rate while maintaining continuous treatment of pathogens by available oxygen.

SUMMARY OF THE INVENTION

Briefly, one embodiment of the invention comprises a process for treating effluent in a gravity media filter in which incoming sewage is initially filtered in a pre-filter to produce a liquid effluent which is then subjected to further treatment. The liquid effluent from the pre-filter is pumped to a pulse-feeding device intermittently discharging the effluent in short volume-controlled pulses at preselected time intervals. The effluent from the pulse-feeding device is forward pulse-fed to an array of drip irrigation emitters spread out over a surface area of a gravity media filter for feeding small doses of the effluent to the surface area of the filter at a rate substantially less than a standard drip irrigation rate.

The invention provides continuous treatment by available oxygen by avoiding clogging of the drip emitters and buildup of biological matter in the filter media, while also maintaining a reasonably practical load rate.

These and other aspects of the invention will be more fully understood by referring to the following detailed description and the accompanying drawings.

DETAILED DESCRIPTION

Figure 1:
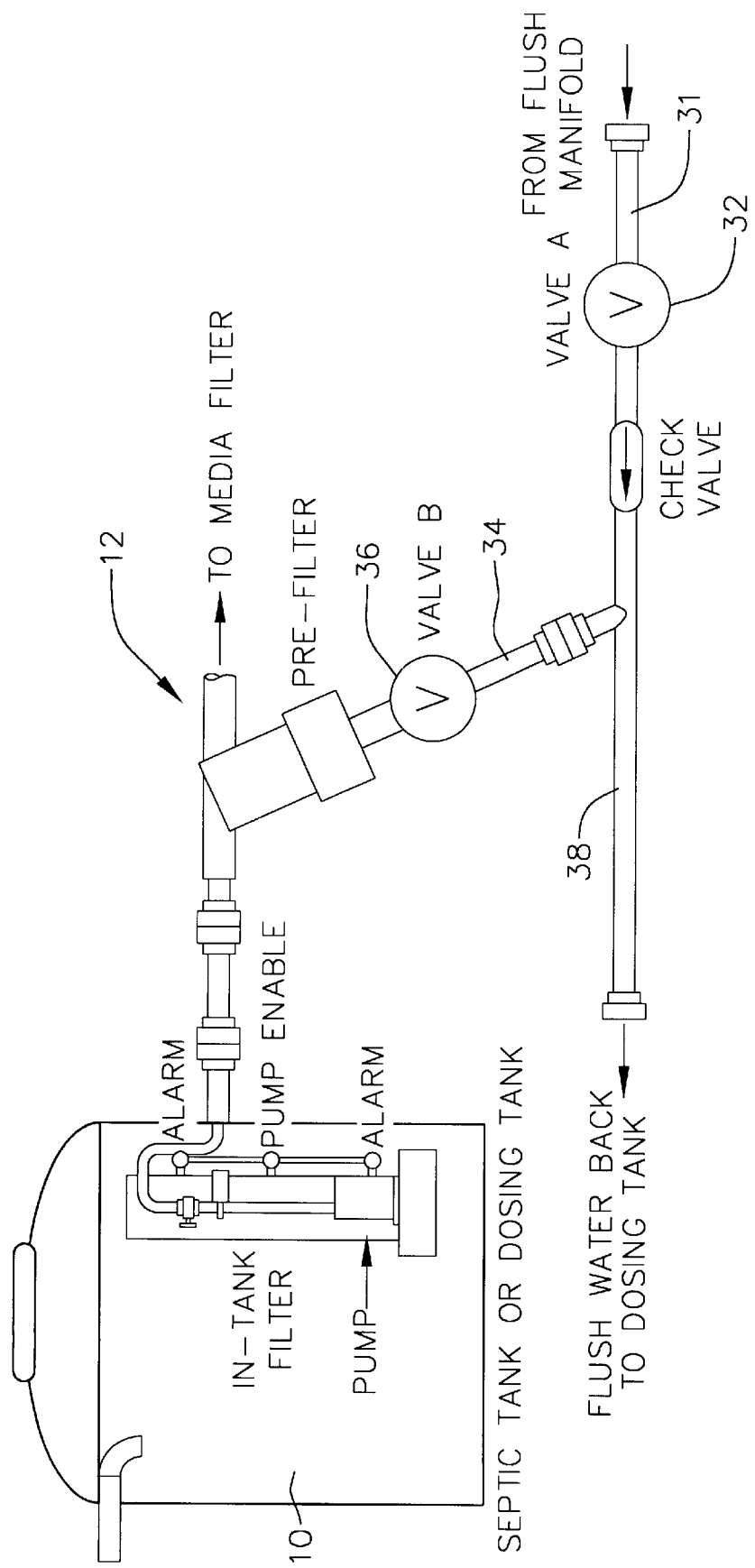
FIG. 1 is a schematic elevational view illustrating components of a dosing system for gravity media filters which include a pre-filter and a backflush system.
Figure 2:
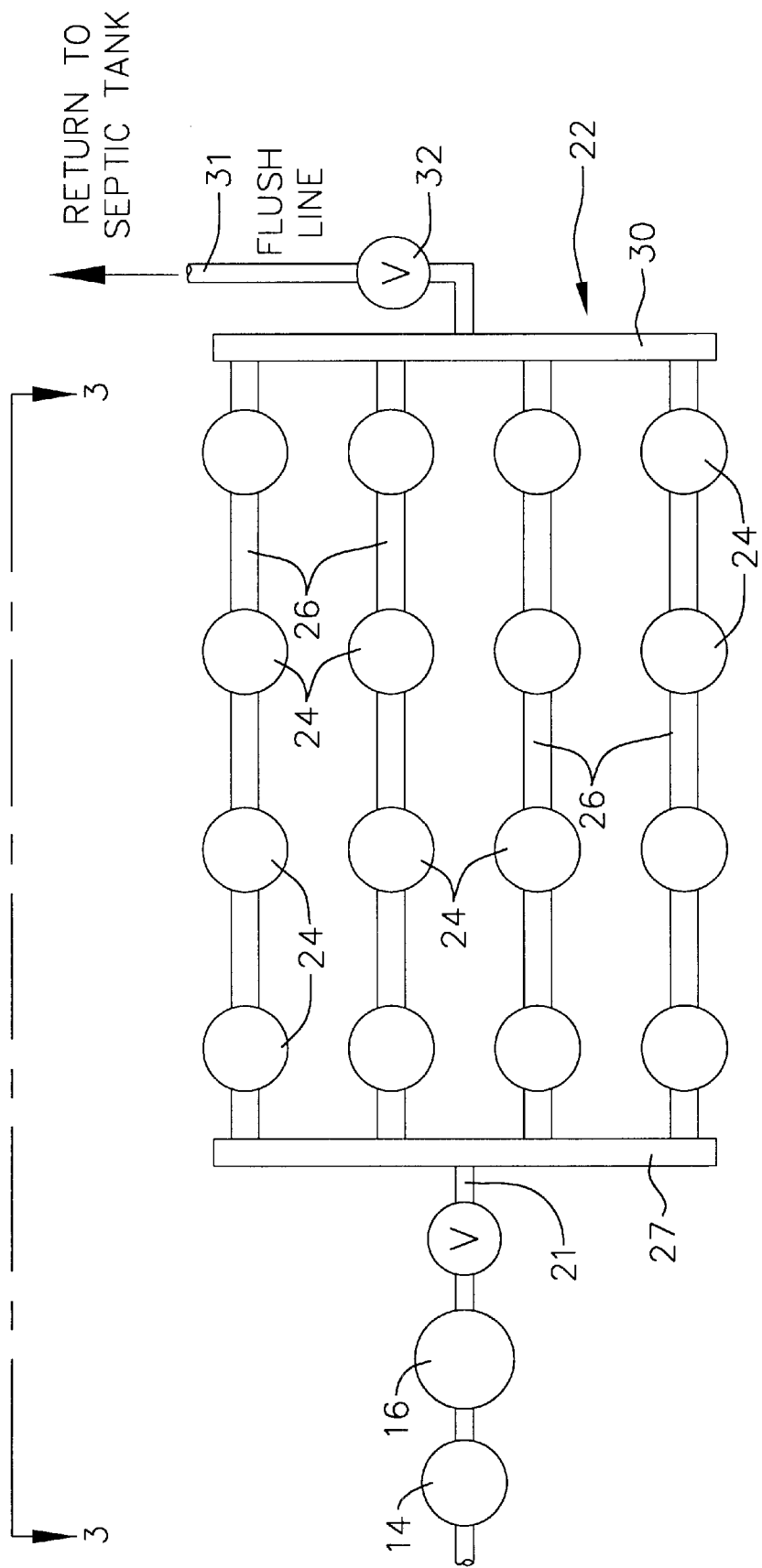
FIG. 2 is a schematic side elevational view showing a system for minute dosing a gravity media filter via a system of drip irrigation emitters.
Figure 3:
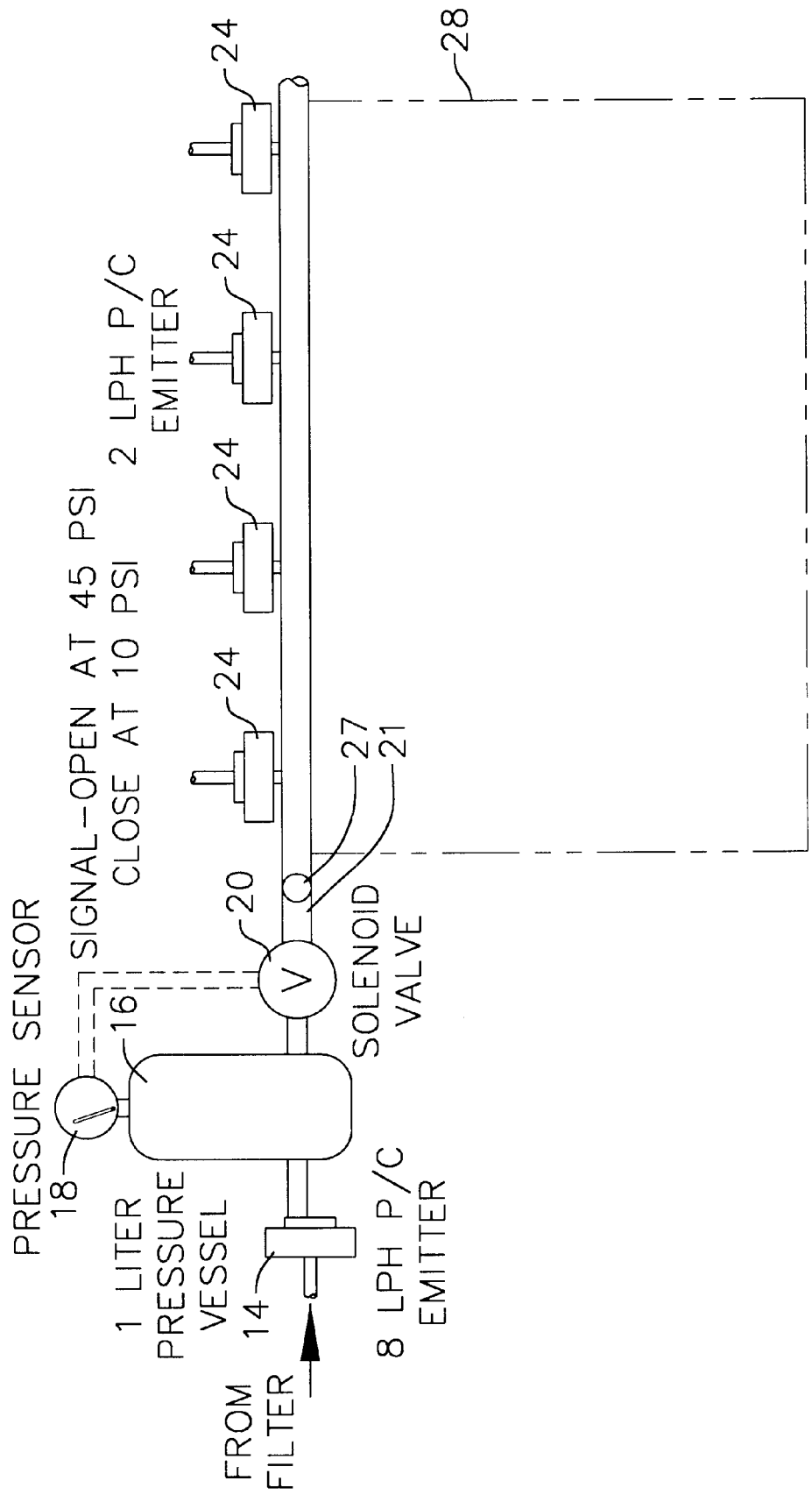
FIG. 3 is a schematic top elevational view taken on line 3—3 of FIG. 2.

Referring to the drawings, sewage is initially delivered to a septic tank or dosing tank 10 for filtering large solids having a particle size greater than about 300 to 500 microns. Sewage effluent from the septic tank 10 then passes through a pre-filter 12 designed to remove particles in excess of 100 microns. The pre-filter 12 is preferably a Geoflow ¾" or 1" Vortex filter— a mesh filter that filters out particles having a particle size as low as 100 microns. The pre-filter also can be a screen filter, a disc filter or a pressurized sand filter, for example. The effluent from the pre-filter 12 is pumped (preferably at 40 psi) into a flow control device 14 which maintains a constant output flow of approximately 8 liters per hour. The flow control device is preferably a pressure-compensating emitter.

The controlled output flow is passed to a one liter pressure vessel 16 controlled by a pressure sensor 18 which allows pressure to build in the vessel to a maximum preset pressure which opens a valve 20 and holds it open until the pressure drops to a preset minimum pressure. This pulse feeding device repeatedly discharges preset volume-controlled pulse feeds of effluent from the vessel at a preferred pulse rate of approximately 15 seconds 10 times per hour. In this embodiment a pressure level of 25 psi opens the valve and holds it open until pressure drops to 5 psi. Alternatively, the pulse feeds of the effluent could be discharged repeatedly at electronically controlled time intervals by a time-dependent on-off controller instead of the pressure controller. Pulse feeding of the effluent also can be produced by a mechanical device such as a crank-operated piston-cylinder device that feeds controlled volumes of effluent at pre-set time intervals.

The forward pulse feeds of effluent from the pressure vessel are supplied via a line 21 to a grid 22 of drip irrigation emitter units 24 connected in rows by intervening lines 26 running from an inlet manifold 27. The drip irrigation emitters discharge minute doses of effluent to the top surface area of a gravity media filter 28 such as a sand and gravel filter or a filter containing other filtering media such as chips of non-woven textile or fiber or hollow plastic spheres, for example. The filtering action operates by gravity and is essentially unpressurized.

In one embodiment, the pulse feeds from the pressure vessel are supplied to a grid pattern of 50 drippers at a rate of 7.5 ml per dripper per pulse, or 375 ml total volume of pulse output to the drippers. The drippers are preferably pressure-compensating drip irrigation emitters capable of producing output doses of preferably one milliliter per dripper every two seconds. The short periodic pulses are supplied to each of the drippers in unison throughout the grid, and the effluent is supplied by the drippers to the media filter relatively uniformly across its surface at a slow periodic drip rate. The resulting net output rate from the drippers is substantially less than a conventional drip irrigation drip rate. Extremely slow drip rates are desired. Standard drip irrigation drip rates are 2, 4 and 8 liters per hour (lph). The drip rate produced by the emitters of this invention is preferably less than 2 lph, because of the pulse-feeding of effluent to the drippers which reduces flow rate ultimately from the drippers. That is, the pulse-feeding of effluent to the drippers in effect is a pressure pulsing of the drippers so that a 2 lph dripper, for example, operates at a fraction of the 2 lph standard output, depending upon the relative proportions of time the effluent is pressurized or not pressurized by the pulse-feeding system. The slow drip rate enhances oxygen availability for removing pathogens contained in the effluent. The lines in the system are kept full between pulses to ensure that drainage does not reduce accuracy and uniformity of the dose. The minute doses of effluent spread through the filter media by capillary action without saturating the media, which avoids depriving the filter of oxygen.

This filter action increases filter efficiency by virtually eliminating pathogens, including viruses, not isolated by other known gravity media filtering techniques.

Experimental tests have shown that pre-filtering the effluent with the 100 micron filter in the pre-filter 12 prevents clogging of the drip emitters and the filter media. This can have a beneficial effect on load rate, i.e., the number of gallons of water treated per day. By preventing biological matter from forming in the filter media and by preventing clogging of the drip emitters, more treated water per day at higher load rates is possible, along with continued availability of oxygen to treat pathogens contained in the effluent.

The system is flushed periodically to prevent undesired buildup of biological material in the filter media and in the pre-filter. The array of drip emitters connects to a flush manifold 30 having a flush line 31 with a flush valve 32 which is opened approximately once per day to flush the filter media. The pre-filter 12 connects to a backflush line 34 having a valve 36 which is opened for about 30 seconds at approximately 5 minute intervals during operating time to backflush the pre-filter 12. Water used for flushing is sent back to the septic tank 10 via a line 38.

EXAMPLE

The following data represent an experimental test of the process described above. The test was conducted on a small research sized filter. The example can be carried out on other larger filters by scaling up the size proportionately.

| Media filter 4 ft. diameter | | |
|---|---|---|
| Area | = | 12.6 sq. ft. |
| 4 drippers per sq. ft. (6" grid) | = | 50 drippers |
| Maximum application rate | = | 2 g/ft$^2$.d |
|  | = | 25 gallons per filter per day |
| Application rate per dripper | = | 1/2 gph |
| Total application rate | = | 25 gph |
| Total pulsing time | = | 1 hour per day pulse 15 seconds |
|  |  | 0.002 gallons per dripper per pulse |
|  |  | 7.5 ml per dripper per pulse |
| Total volume of pulse to 50 drippers | = | 375 ml. |

The rate of feeding per hour is much lower than common drip irrigation rates. The drip rate is for ¼ of a minute in 12 minutes, or an effective rate of ¹⁄₄₈th of the standard dripper rate per hour. The derived pulse rate is generally about 1.0 ml to 100 ml for about 2 seconds.

This small dose requires that drainage does not take place and the system stays full between pulses. The use of a riser on the on-line emitter can achieve this requirement with reasonable tolerance on leveling of the grid.

Instead of a pressure sensor, a timer or PLC with a repeating cycle can be used. 11¾ minutes off and 15 seconds on, can be used, for example.

Instead of a grid for a square tank, a spiral wound for a round tank can be used which reduces connections. The tube can wind down to a 12" diameter.

I claim:

1. A process for the minute dosing of effluent to a gravity media filter comprising filtering incoming sewage in a pre-filter to produce a liquid effluent; passing the liquid effluent from the pre-filter to a pulse-feeding device to intermittently discharge the effluent in short volume-controlled pulses at preselected time intervals; and forward pulse feeding the effluent from the pulse-feeding device to one or more effluent supply lines having connected thereto an array of drip irrigation emitter devices spread out over a surface area of a gravity filter containing a filter media for feeding the minute doses of the effluent to the surface area of the filter at a rate substantially less than a standard drip irrigation drip rate.

2. The process according to claim 1 in which the drip irrigation emitter devices are pressure-compensating.

3. The process according to claim 2 in which the derived output drip rate per drip irrigation emitter device to the filter surface area is in the range of about one ml to about 100 ml per each 2 second long drip interval.

4. The process according to claim 1 in which the pulse-feeding device is pressure-controlled to discharge effluent when its pressure periodically builds to a preselected pressure.

5. The process according to claim 1 in which the pulse-feeding device is timer controlled to discharge a preset volume of effluent at periodic time intervals.

6. The process according to claim 1 in which the pulse-feeding device's output is mechanically controlled to discharge controlled amounts of the effluent at periodic time intervals.

7. The process according to claim 1 in which the output drip rate avoids oxygen deprivation in the filter media and removes pathogens including viruses contained in the liquid effluent subjected to such filtration.

8. The process according to claim 1 in which the pre-filter removes particles having a particle size as low as about 100 microns.

9. The process according to claim 1 in which the gravity media filter is an essentially non-pressurized filter having particulate filter media.

10. The process according to claim 1 in which the pulse-feeding device comprises a vessel having a controlled pulsing unit allowing pre-filtered effluent in the vessel to discharge from the vessel in pulses applied to the drip irrigation emitter devices.

11. The process according to claim 1 in which the drip irrigation emitter devices deliver effluent to an input side of the gravity media filter at an average drip rate of less than 2 liters per hour during operation of the filter.

12. The process according to claim 1 in which the pulse-feeding device comprises a pressure compensating drip irrigation emitter for receiving the pre-filtered effluent, and a pressure vessel downstream from the pressure compensating emitter for receiving effluent from the pressure compensating emitter and discharging the effluent to the array of drip irrigation emitter devices.

13. A process for minute dosing of gravity media filter comprising pre-filtering sewage effluent to remove solids having a particle size of about 100 microns and greater to produce a pre-filtered effluent, passing the pre-filtered effluent to one or more effluent supply lines having connected thereto an array of drip irrigation emitter devices spread out over a surface area of a gravity media filter, and causing the array of emitter devices to deliver the pre-filtered effluent to an input side of the gravity media filter at an average drip rate of less than 2 liters per hour during operation of the filter.

14. A process according to claim 13 in which the derived output drip rate per drip irrigation emitter device to the filter surface area is in the range of about one ml to about 100 ml per each 2 second long drip interval.

15. A process according to claim 13 in which the output drip rate avoids oxygen deprivation in the filter media and removes pathogens including viruses contained in the liquid effluent subjected to such filtration.

16. A process according to claim 13 in which the gravity media filter is an essentially non-pressurized filter having particulate filter media.

17. A process according to claim 13 in which the pulse-feeding device comprises a vessel having a controlled pulsing unit allowing pre-filtered effluent in the vessel to discharge from the vessel in pulses applied to the emitters.

18. The process according to claim 13 in which the pulse-feeding device comprises a pressure compensating drip irrigation emitter for receiving the pre-filtered effluent, and a pressure vessel downstream from the pressure compensating emitter for receiving effluent from the pressure compensating emitter and discharging the effluent to the array of drip irrigation emitter devices.

19. A process for the minute dosing of effluent to a gravity media filter comprising filtering incoming sewage in a pre-filter to produce a liquid effluent; passing the liquid effluent from the pre-filter to a pulse-feeding device to intermittently discharge the effluent in short volume-controlled pulses at preselected time intervals; and forward pulse feeding the effluent from the pulse-feeding device to one or more effluent supply lines having connected thereto an array of pressure-compensating drip irrigation emitter devices spread out over a surface area of a gravity filter containing a filter media for feeding the minute doses of the effluent to the surface area of the filter at an average drip rate of less than about 2 liters per hour during operation of the filter.

20. The process according to claim 19 in which the pulse-feeding device is pressure controlled to discharge effluent when its pressure periodically builds to a preselected pressure.

21. The process according to claim 19 in which the pre-filter removes particles having a particle size as low as about 100 microns.

22. The process according to claim 19 in which the pulse-feeding device comprises a vessel having a controlled pulsing unit allowing pre-filtered effluent in the vessel to discharge from the vessel in pulses applied to the emitters.

23. A process for the minute dosing of effluent to a gravity media filter comprising filtering incoming sewage in a pre-filter to produce a liquid effluent; passing the liquid effluent from the pre-filter to a pulse-feeding device to intermittently discharge the effluent in short volume-controlled pulses at preselected time intervals; and forward pulse feeding the effluent from the pulse-feeding device to one or more effluent supply lines having connected thereto an array of drip irrigation emitter devices spread out over a surface area of a gravity filter containing a filter media for feeding the minute doses of the effluent to the surface area of the filter at a derived emitter output drip rate per drip irrigation emitter device in the range of about one to about 100 ml per each 2 second long drip interval.

24. The process according to claim 23 in which the drip irrigation emitter devices are pressure-compensating.

25. The process according to claim 23 in which the pulse-feeding device is pressure controlled to discharge effluent when its pressure periodically builds to a preselected pressure.

26. The process according to claim 23 in which the pre-filter removes particles having a particle size as low as 100 microns.

27. Apparatus for the treatment of incoming sewage and for the minute dosing of the treated effluent to a gravity media filter, comprising a pre-filter for filtering incoming sewage to produce a liquid effluent; a pulse-feeding device; a line for passing the liquid effluent from the pre-filter to the pulse-feeding device to intermittently discharge the effluent in short volume-controlled pulses at preselected time intervals; a forward pulse feeding system to pulse feed the effluent from the pulse-feeding device to a gravity media filter; and one or more effluent supply lines having connected thereto an array of drip irrigation emitter devices spread out over a surface area of the gravity filter for feeding minute doses of the pulse-fed effluent to the surface area of the filter at a rate substantially less than a standard drip irrigation drip rate.

28. Apparatus according to claim 27 in which the drip irrigation emitter devices are pressure-compensating.

29. Apparatus according to claim 28 in which the derived output drip rate per drip irrigation emitter device to the filter surface area is in the range of about one ml to about 100 ml per each 2 second long drip interval.

30. The process according to claim 27 in which the pre-filter removes particles having a particle size as low as about 100 microns.

* * * * *